Patented Nov. 24, 1931

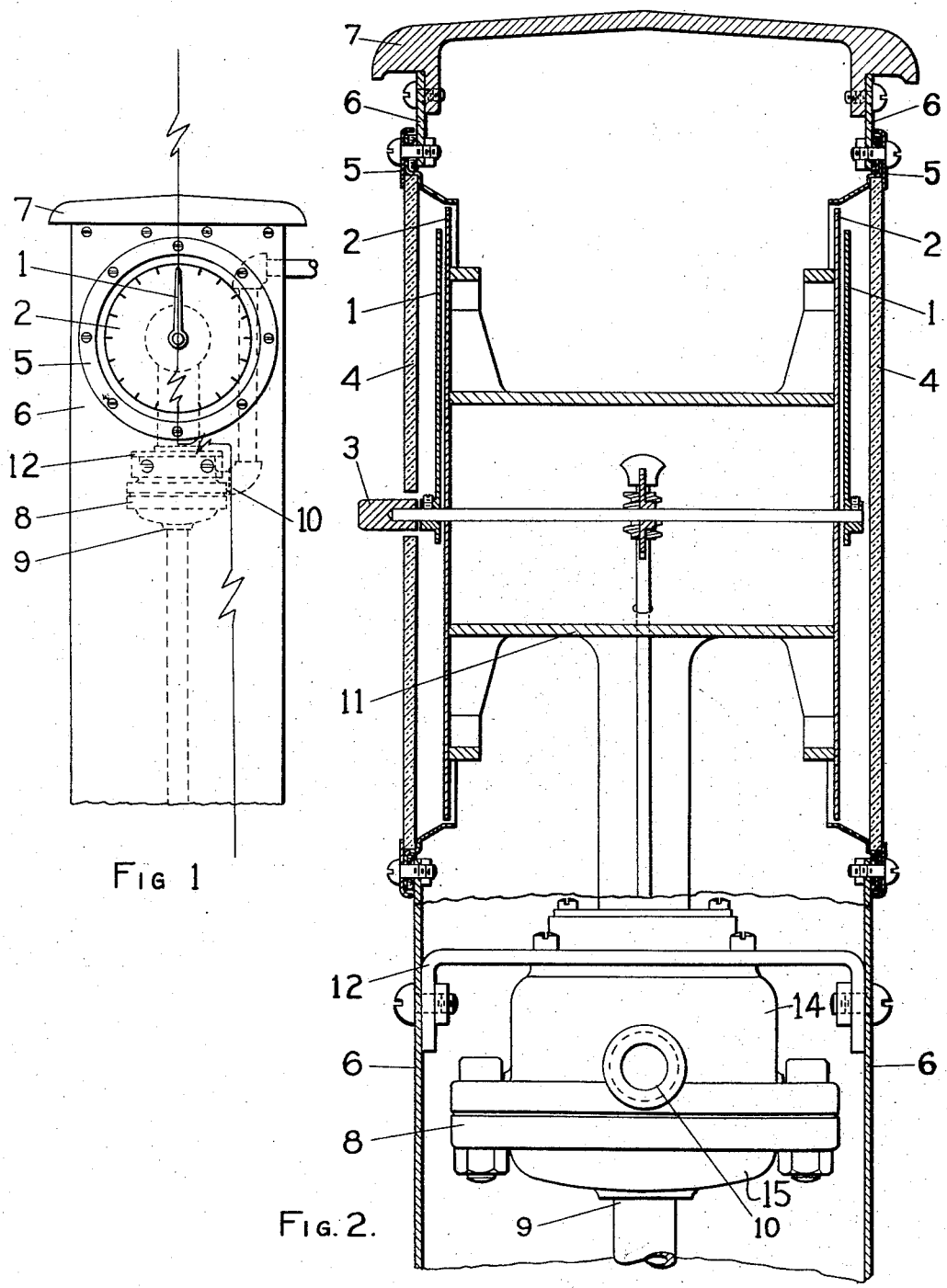
Nov. 24, 1931. R. S. BASSETT 1,832,852
LIQUID METER
Filed March 5, 1928

1,832,852

UNITED STATES PATENT OFFICE

ROBERT S. BASSETT, OF BUFFALO, NEW YORK

LIQUID METER

Application filed March 5, 1928. Serial No. 259,194.

The general object of the invention is to provide a method for holding the meter in such a position that the dial faces of the meter indicating mechanism may be covered over by means of pieces of sheet glass, so as to prevent rain and dirt from getting on the dial face of the meter.

The invention has special reference to liquid meters having dial faces relatively large in size, where no previous successful method existed for covering the dial face of the meter with the glass neatly, and at the same time efficiently.

In the accompanying drawings Figure 1 is a view towards a dial face of the meter showing the dial face covered by its protecting glass, and also showing a cabinet enclosing the entire meter, so that the only part of the meter exposed to view is the dial face, which is visible through the transparent dial glass.

Figure 2 is a vertical section through the top part of the cabinet and through the indicating mechanism of the meter. This section is a broken section as the measuring mechanism of the meter is not shown in section, as this is of any usual type, such as the positive displacement nutating disc type, which is commonly used for this work.

In Figures 1 and 2, 1 is the indicating hand showing the amount of liquid which passes through the meter. 2 is a graduated dial over which the indicating hand 1 moves, so as to give meter readings, indicating the amount of liquid measured by the meter. 3 is a set back device of any of several variations which is used for setting the indicating hand at a zero position, at the start of a flow of liquid, so that after the flow is ended, the position of hand 1 with reference to dial 2, will show the amount of liquid which has just passed through the meter during the previous measuring cycle. 4 is the glass over indicating hand 1 and dial 2, protecting these parts from rain and dirt which may exist on the outside of the meter enclosure. 5 is the mounting for meter glass 4, and may be one of several variations, not being limited to the exact construction shown. This mounting 5, is to provide a reasonably tight joint between dial glass 4, and cabinet body 6.

In the drawings shown, the liquid meter is set in a sheet metal cabinet which is the customary setting for liquid meters of this type for retail sales of gasoline and lubricating oils. Cabinet or tubular housing 6, may have several modifications, but its essential feature is that it in general, encloses the liquid meter protecting it from weather conditions, as these cabinets when used for retail sales of gasoline are usually set in the open air, and are not protected in any way from weather conditions.

7, is the top of the cabinet 6, and is usually a separate part as shown in the drawings, but this exact construction is not important.

The important point of the above described construction is the mounting on cabinet 6, of dial glass 4, by means of dial glass mounting 5, and the glass is thereby fastened firmly to the cabinet, presenting a neat appearance. On the previous methods of construction, the dial glass has been attached to the meter itself, so that it has not been possible to hold the dial glass in such a manner that it appeared to be an integral part of the cabinet. The meter measuring mechanism 8, as shown, has an inlet opening 9 and an outlet opening 10, though either of these two openings may be in any part of the outer casing, of meter measuring mechanism 8, the construction not being limited to the exact form shown. 11, is the meter indicating mechanism which as previously described, has indicating hand or hands 1, and indicating dial or dials 2. This register transmits the motion of measuring mechanism 8 to indicating hands 1 with suitable gear ratios so that the flow of the liquid through measuring mechanism 8, is indicated by hands 1 on dial 2, in customary units of measurement such as U. S. gallons.

The outer casing of meter measuring mechanism 8 is shown in two sections. The upper section 14 and the lower section 15 together form the complete measuring mechanism casing.

In order that indicating mechanism 11 may be held in place properly with reference to dial glass or dial glasses 4, it is necessary to provide some means for locating the indicating mechanism 11, with reference to cabinet wall 6, and consequently to dial glass 4.

As shown in Figure 2, 12 is a bracket, engaging the liquid meter and also engaging the cabinet wall. The combination of the above described parts is novel in the trade and constitutes a great improvement over the previously existing method, whereby the dial covering glass was attached to the indicating mechanism 11, directly, which construction did not provide for a neat and efficient joint at this point with reference to cabinet wall 6.

Having described the invention what I claim as new and desire to secure by Letters Patent is:

1. In a liquid dispensing device, a tubular housing having opposed openings; a liquid operated measuring mechanism in said housing; an indicating mechanism operatively connected to and mounted upon said liquid operated measuring mechanism, and supported thereby substantially independent of the housing, said indicating mechanism including dials positioned adjacent said openings of said housing; a bracket secured to and supporting said liquid operated measuring mechanism; means for securing said bracket to opposite sides of the housing; a transparent cover for each of said openings of said housing; means for securing said transparent covers to the housing substantially independent of said indicating mechanism; and means for conveying liquid to and from said liquid operated measuring mechanism, substantially as and for the purpose described.

2. In a liquid dispensing device, housing means provided with an opening for a meter dial; a liquid meter within said housing comprising a liquid operated measuring mechanism and an indicating mechanism operatively connected to the measuring mechanism and supported substantially independent of the housing; a movable indicating hand and a stationary radially graduated dial mounted upon said indicating mechanism adjacent the opening in said housing; a holding bracket secured to and supporting said liquid meter; means for securing said bracket to opposed sides of said housing; a transparent cover for the opening of said housing; means for securing said transparent cover to the housing substantially independent of said indicating mechanism; and means for conveying liquid to and from said liquid meter, substantially as and for the purpose described.

3. In a liquid dispensing device, a tubular housing having opposed openings; a liquid operated measuring mechanism in said housing comprising an outer casing having an upper section and a lower section detachable from said upper section; an indicating mechanism operatively connected to and mounted upon said liquid operated measuring mechanism, and supported thereby independently of the housing, said indicating mechanism including stationary radially graduated dials positioned adjacent the openings in said housing; holding means supporting said liquid operated measuring mechanism and secured to the upper section of the outer casing of said liquid operated measuring mechanism; means for securing said holding means to said tubular housing; transparent covers for the opposed openings in said housing; means for securing said transparent covers to said housing substantially independent of said indicating mechanism; and means for conveying liquid to and from said liquid operated measuring mechanism, substantially as and for the purpose described.

4. In a liquid dispensing device, a tubular housing having an opening for a meter dial; a liquid operated measuring mechanism in said housing comprising an outer casing having an upper section and a lower section detachable from said upper section; an indicating mechanism operatively connected to said liquid operated measuring mechanism and mounted upon the upper section of the outer casing for said liquid operated measuring mechanism, and supported thereby substantially independent of the housing, said indicating mechanism including a dial positioned adjacent the opening in said housing; holding means supporting said liquid operated measuring mechanism and secured to the upper section of the outer casing for said liquid operated measuring mechanism; means for securing said holding means to said housing; a transparent cover for the opening of said housing; means for securing said transparent cover to the housing substantially independent of said indicating mechanism; and means for conveying liquid to and from said liquid operated measuring mechanism, substantially as and for the purpose described.

ROBT. S. BASSETT.